INVENTORS
DEWEY L. ANDERSON
WAYNE H. WOODS
BY
ATTORNEY

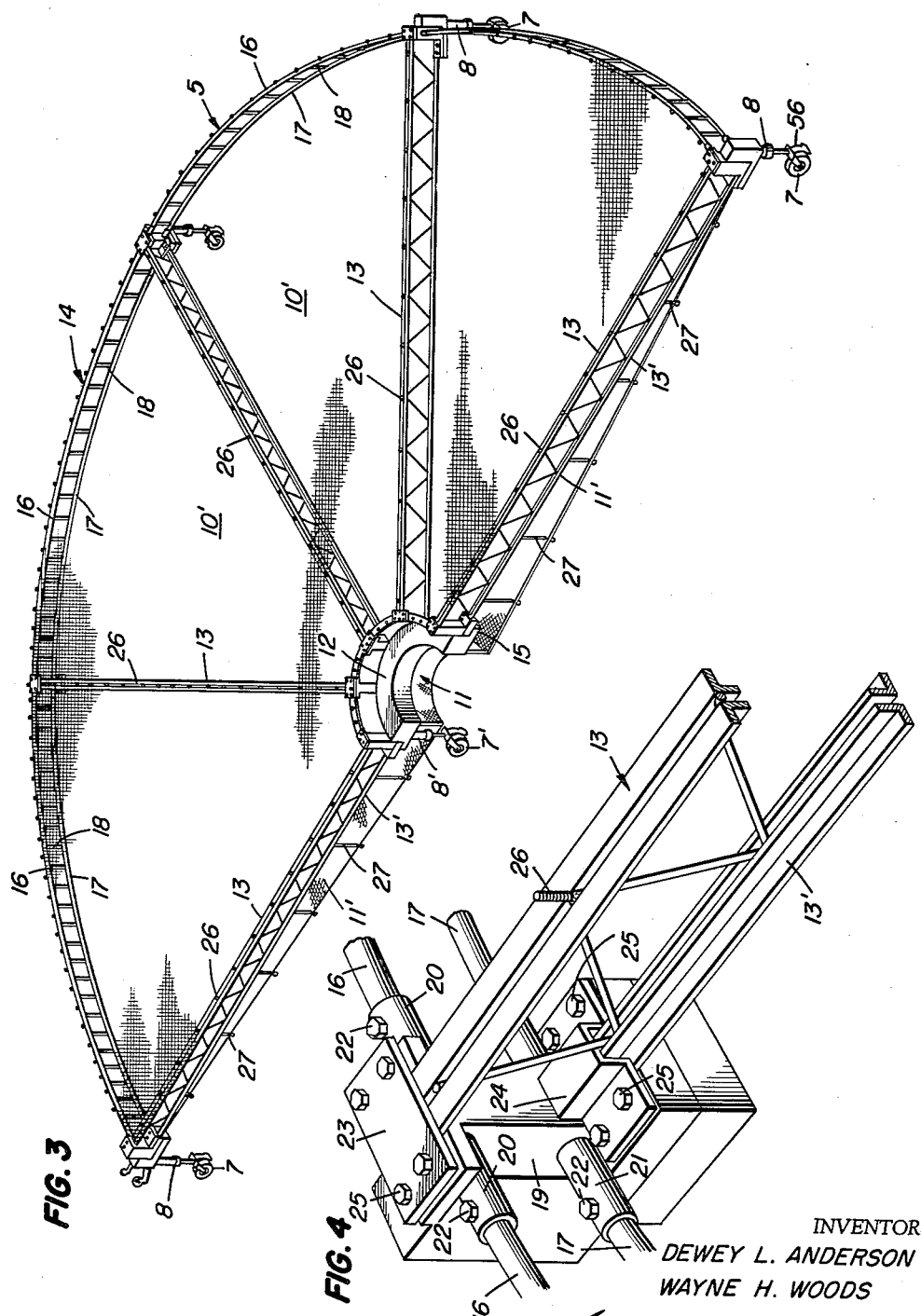

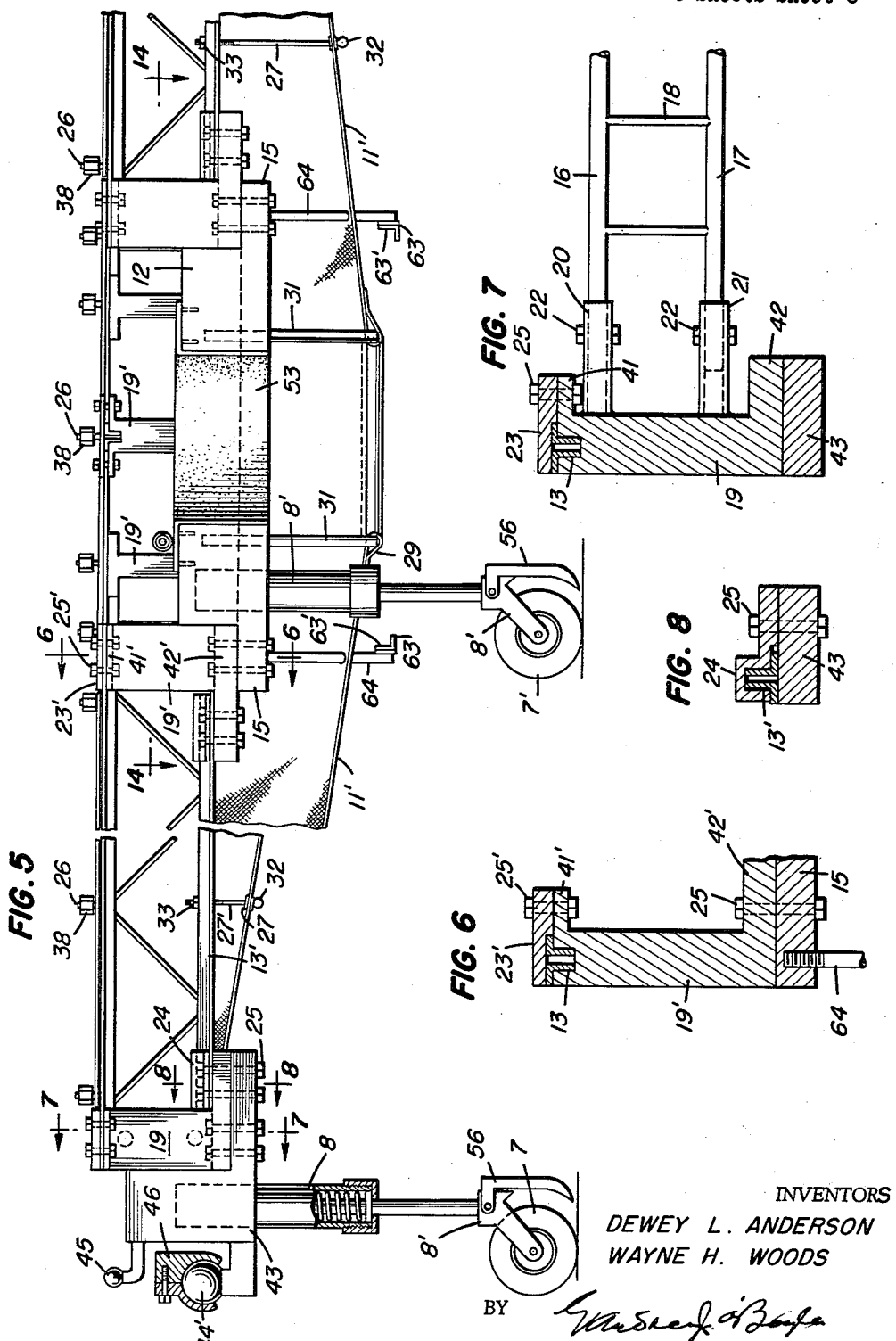

Oct. 1, 1963     D. L. ANDERSON ET AL     3,105,347
NUT HARVESTING MACHINE

Filed Nov. 2, 1961     6 Sheets-Sheet 4

INVENTORS
DEWEY L. ANDERSON
WAYNE H. WOODS

BY

ATTORNEY

Oct. 1, 1963     D. L. ANDERSON ET AL     3,105,347

NUT HARVESTING MACHINE

Filed Nov. 2, 1961     6 Sheets-Sheet 5

INVENTORS
DEWEY L. ANDERSON
WAYNE H. WOODS

BY

ATTORNEY

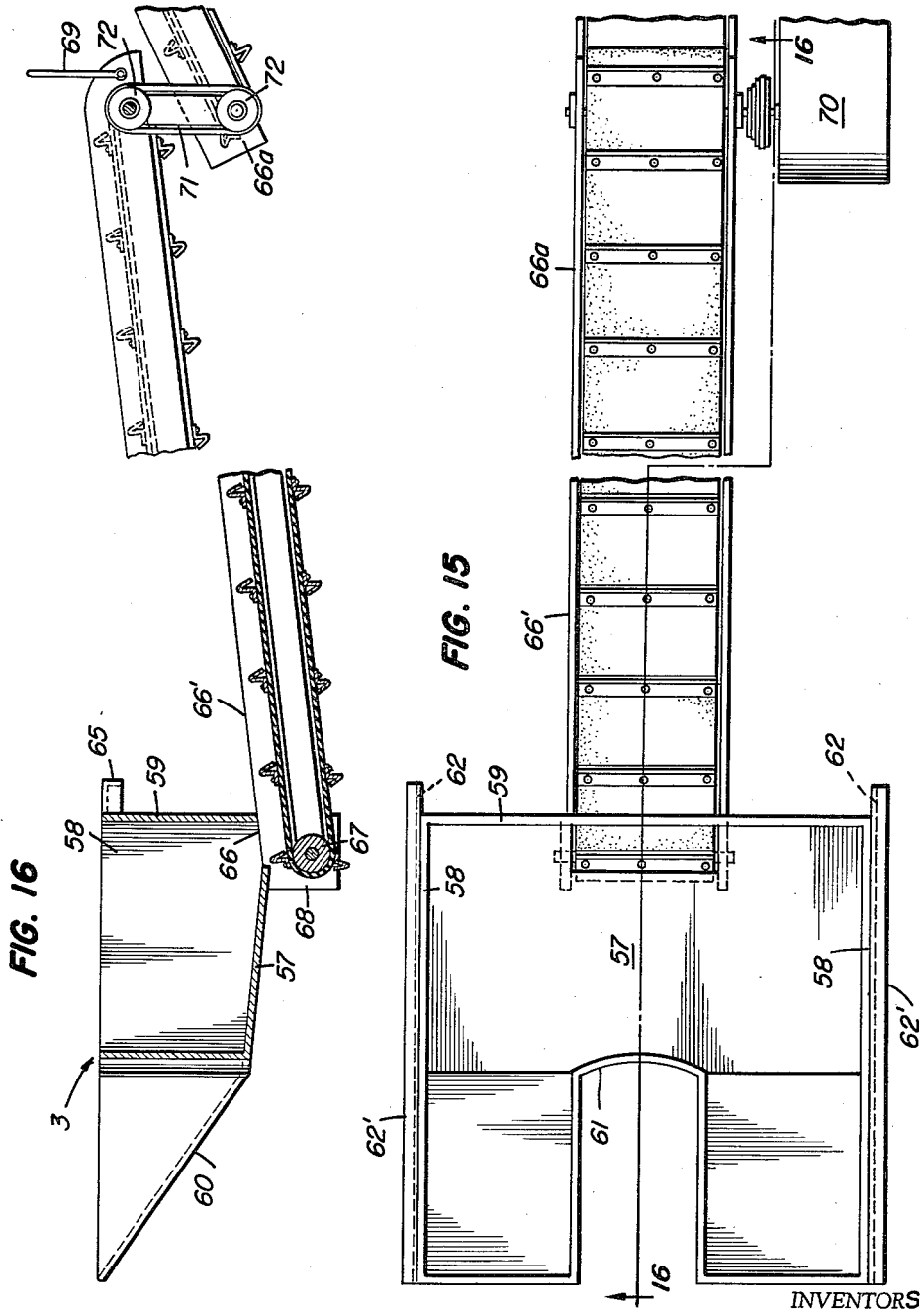

United States Patent Office 3,105,347
Patented Oct. 1, 1963

3,105,347
NUT HARVESTING MACHINE
Dewey L. Anderson, 1503 Forsyth Ave., and Wayne H. Woods, 1004 Speed St., both of Monroe, La.
Filed Nov. 2, 1961, Ser. No. 149,775
6 Claims. (Cl. 56—329)

This invention relates to a machine for harvesting nuts, and more particularly to a machine for gathering pecan nuts.

An object of our invention is to provide an improved machine for harvesting nuts.

Another object of our invention is to provide an improved machine for gathering nuts which have fallen from a tree onto a nut-catching unit positioned under the tree.

Yet another object of our invention is to provide an improved mobile nut harvesting machine having a nut-catching and collecting unit adapted to be positioned under a tree to receive and collect nuts falling therefrom.

Still another object of our invention is to provide an improved nut-catching and collecting unit comprised of two hinged semi-circular members adapted for placement around the trunk of a tree from which nuts are to be harvested.

A further object of our invention is to provide an improved mobile machine for harvesting pecan nuts having a nut-catching and collecting unit adapted for placement under a tree, said nut-catching and collecting unit incorporating means for separating leaves, twigs, and other foreign materials from the nuts falling thereon.

A still further object of our invention is to provide an improved mobile machine for harvesting pecan nuts, having a nut-catching and collecting unit adapted for placement under a tree, said unit incorporating a collecting bin for the nuts falling thereon, and conveyor means for removing nuts from the bin and conveying them to storage.

Yet a further object of our invention is to provide an improved machine for harvesting pecan nuts which is strong and sturdy in construction, easily assembled and readily movable into operative position with respect to a tree, and not liable to get out of order even after long and continued use.

With these and other objects in view, which may be incident to our improvements, the invention consists in the parts and combinations to be hereinafter set forth and claimed, with the understanding that the several necessary elements comprising our invention, may be varied in construction, proportions and arrangements, without departing from the spirit and scope of the appended claims.

In order to make our invention more clearly understood, we have shown in the accompanying drawings means for carrying the same into practical effect, without limiting the improvements in their useful application to the particular constructions which, for the purpose of explanation, have been made the subject of illustration.

In the drawings:

FIG. 3 is a perspective view of one of the semi-circular sections shown in FIG. 2;

FIG. 4 is a detailed view of the frame construction of the semi-circular units;

FIG. 5 is a side elevational view, partly in section, of a portion of one of the frames of the nut-catching unit shown in FIG. 2;

FIG. 6 is an enlarged sectional view along line 6—6 of FIG. 5;

FIG. 7 is an enlarged sectional view along line 7—7 of FIG. 5;

FIG. 8 is a sectional view along line 8—8 of FIG. 5;

FIG. 15 is an enlarged top plan view of the nut-collecting bin and nut conveyor means shown in FIG. 1; and FIG. 16 is a view, partly in section, taken along line 16—16 of FIG. 15.

Figure 1:
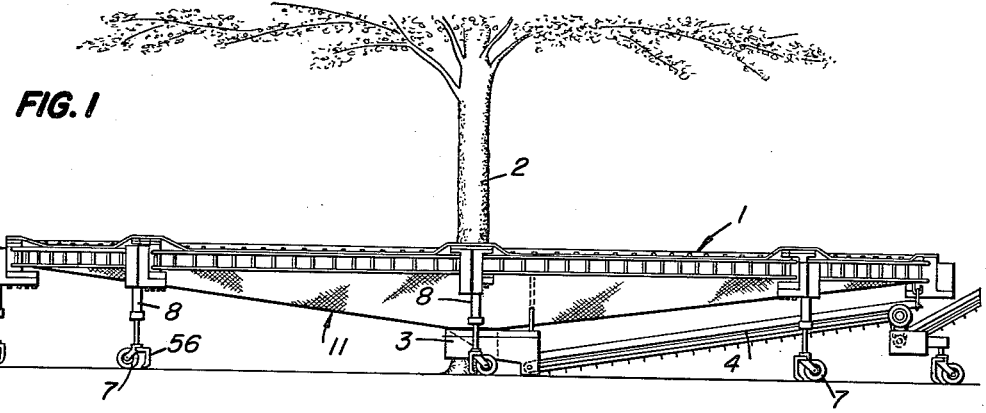
FIGURE 1 is an elevational view, showing the improved nut harvesting machine in operative position with respect to a nut tree.
Figure 2:
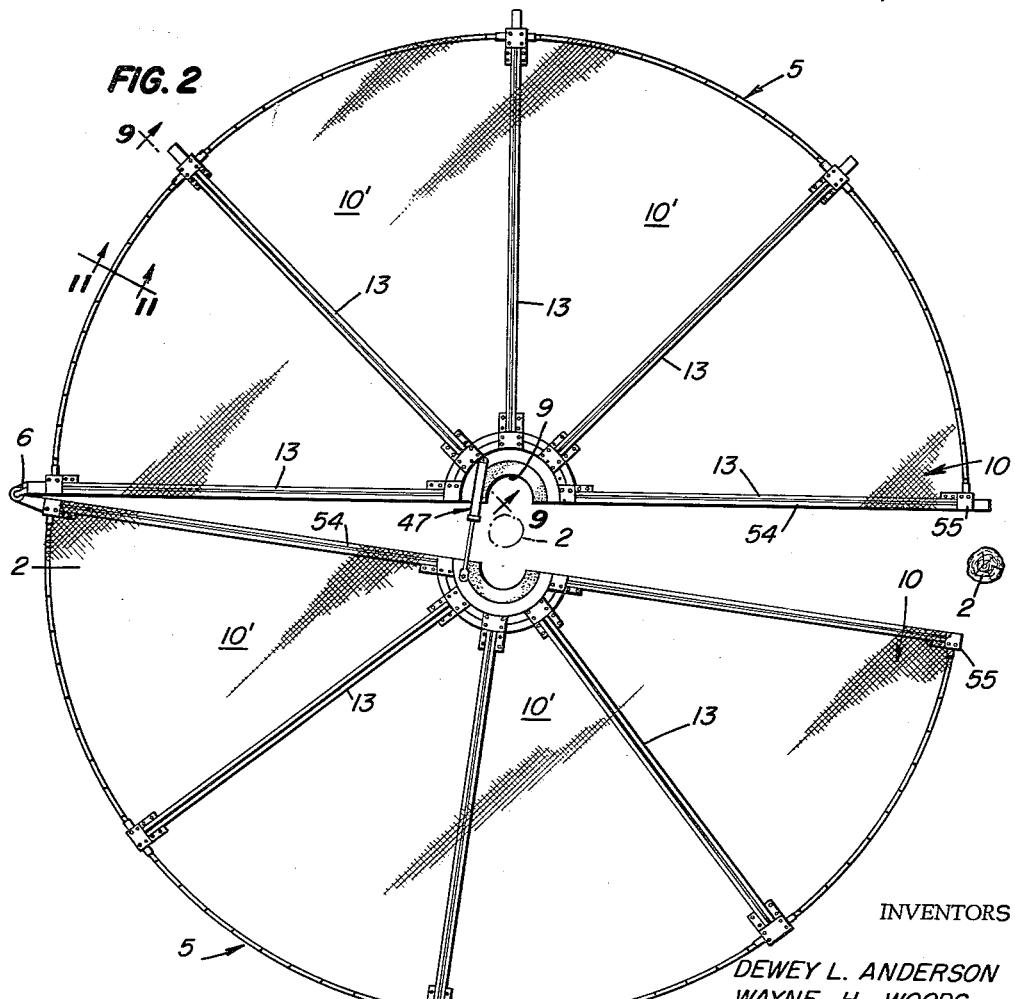
FIG. 2 is a top plan view of the nut-catching unit, showing the semi-circular sections in open position, prior to placement of the unit in surrounding relationship with respect to a tree.
Figure 10:
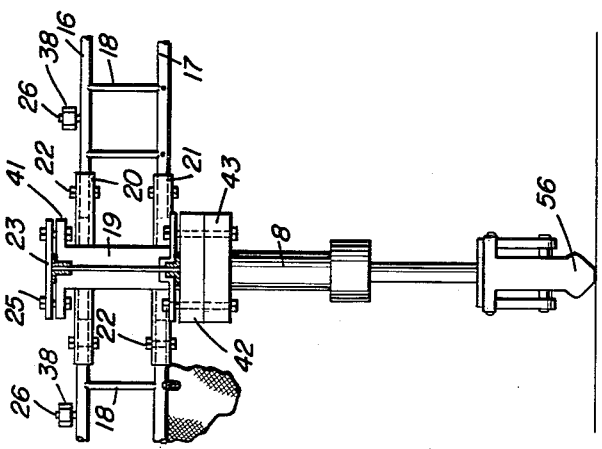
FIG. 10 is a view, partly in section, taken along line 10—10 of FIG. 9.

Referring to the drawings, and more particularly to FIGS. 1 and 2, the improved nut harvesting machine of the present invention comprises, essentially, a circular-shaped nut-catching and collecting unit 1 adapted to be fitted around the trunk of a tree 2, a bin or container 3, into which nuts from the nut-catching member gravitate, and conveyor means 4 associated with the nut-collecting bin 3 for conveying nuts therefrom to a storage container, or to a truck for transportation to storage, not shown. The nut-catching and collecting unit 1 comprises a pair of complementary semi-circular frames 5, hinged as at 6, and supported on suitable rollers 7 associated with peripherally spaced brackets or hangers 8 secured to the frame, whereby the frames may be moved into operative position with respect to a tree. Each of the frames is formed with a semi-circular opening 9 concentric with the center of the frame whereby to form a circular tree-receiving opening, when the frames are moved about their hinged portions 6 to bring them into operative position with respect to a tree, as will be described more fully hereinafter. The top of each frame, except for the semi-circular opening, is covered with a wire screening material 10 of such gauge as to permit pecan nuts, or the like, to readily pass therethrough onto a funnel-shaped member 11 formed from canvas or other suitable fabric, and thence into the collecting bin from which the nuts are conveyed to storage.

Referring to FIGS. 3 and 4, each of the semi-circular sections 5 of the nut collecting unit comprises a central hub portion 12, a plurality of rib members 13, extending radially outward from the hub portion, and a circumferential framing 14. The hub portion is formed with a peripheral flange 15 adapted to support the inner ends of the metal rib framing members 13, which members are similar to the conventional bar joists used in building construction as ceiling joists. The circumferential framing 14 is formed of four similar sections, each of which comprises a pair of tubular members 16 and 17, maintained in vertically spaced parallel relation by means of rods 18, the opposite ends thereof being secured to the tubular members by welding or other suitable means. As will be seen in FIG. 4, the sections of the circumferential framing and the outer ends of the adjacent rib members are interconnected by means of a fitting 19 having tubular members 20 and 21 adapted to receive the end portions 16 and 17 of the framing in telescoping relation, said end portions being retained in seated position by bolts 22, insertable through openings in the tubular members 20 and 21 and a registering opening formed in each end portion. The outer ends of the ribs are secured to the fitting 19 by means of plates 23 and 24 secured in clamping position by bolts 25, and at equi-spaced intervals along the top of each rib suitable threaded studs 26 are provided which serve as hangers to which the sections of the wire screen 10 are attached.

The central portion of each section 5 is supported on a roller 7' having its associated housing secured to the hub portion 12, and the bottom members 13' of the ribs 13 are provided with hangers 27 of gradually decreasing length, from the hub portion to the circumferential framing, for supporting the canvas in a downwardly inclined position. With reference to the arrangement and mounting of the screening 10 and the canvas 11, each of these elements is preferably comprised of four sections 10' and 11', respectively; two sections for each half 5 of the nut catching unit.

Figure 9:
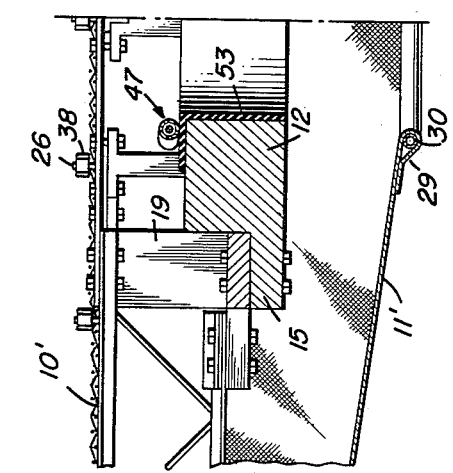
FIG. 9 is an enlarged sectional view taken along line 9—9 of FIG. 2.
Figure 12:
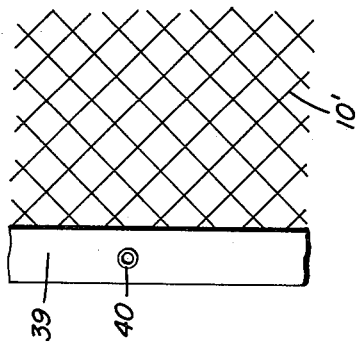
FIG. 12 is a fragmentary detailed view of the screen member of the nut-catching unit.
Figure 11:
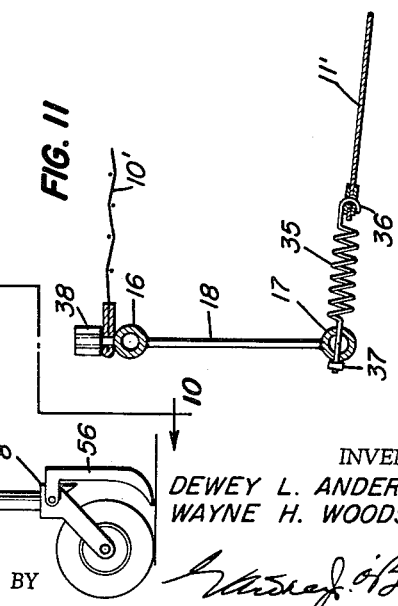
FIG. 11 is an enlarged sectional view taken along line 11—11 of FIG. 2.
Figure 13:
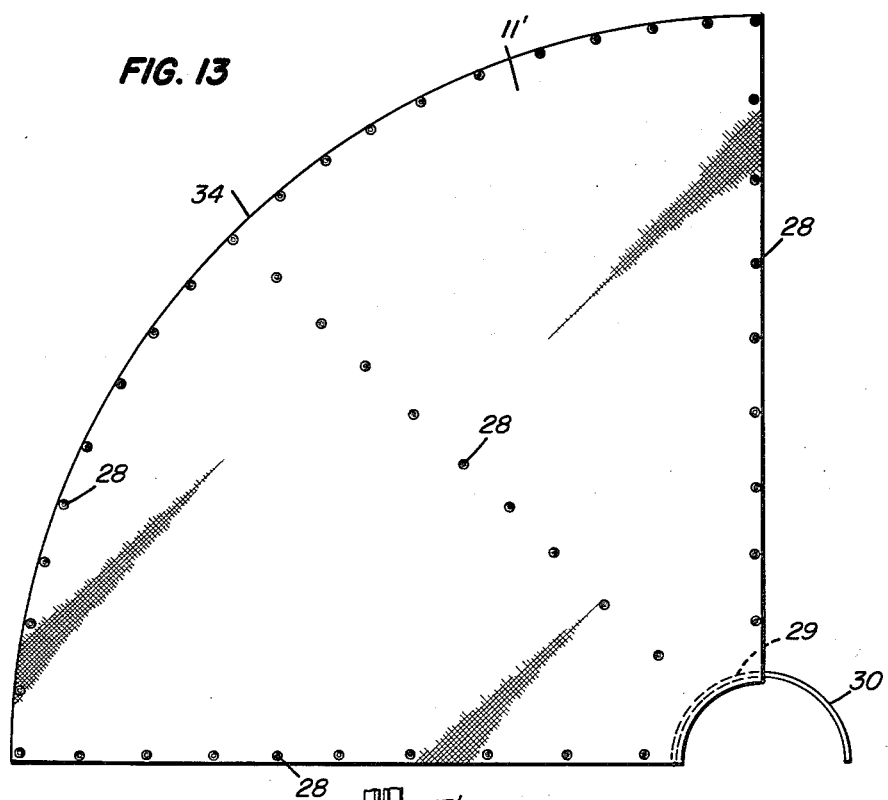
FIG. 13 is an enlarged top plan view of a quadrant of the fabric element of the nut-catching unit.

Referring to FIGS. 5, 9 and 13, each quadrant 11' of the canvas is provided with a plurality of grommets 28 (FIG. 13), the inner central portion of the canvas being folded inwardly and suitably stitched to form a loop or sleeve 29 threadable on a semi-circular metal ring 30, which ring is supported by rods 31 (FIG. 5) carried by the hub member. As noted hereinabove, the canvas supporting rods 27 are of graduated length, and are secured to the bottom member 13' of each of the ribs. Each of the rods 27 is formed with a threaded body portion 27' and a spherical-shaped head 32 of diameter greater than the grommets 28, the threaded end of the rod being insertable through a grommet and a lower member of a rib, as shown. Each of the rods may be vertically adjusted with respect to its support and retained in desired position by means of a nut 33 threadable on the end portion of the rod, and adapted to seat on the upper member of a rib. It will be understood that the edges of the canvas quadrants below the median rib of each section 5 will be overlapped to bring their grommets into registry so as to receive the rods 27, as above described. The canvas quadrants 11' are supported along their peripheral portions 34 (FIG. 13) by means of coil springs 35 having a hook end 36 engaging a grommet 28, the opposite end of the spring being secured to the lower tubular member 17 of the circumferential framing 14, by means of a nut 37 threadable thereon.

The wire screening 10 is also comprised of four sections, each pair of the quadrants being secured to one of the semi-circular shaped frames 5 by means of the thread studs 26 and associated nuts 38, the inner and outer peripheral edge portions of the screen sections 10' being provided with a suitable binding 39 having grommets 40 therein, adapted to fit over the studs 26 carried by the central hub portion and the upper tubular member and be retained thereon by the nuts 38. In connection with the arrangement of the wire screening material, it is of such gauge as to screen out leaves, twigs and like debris, but permits pecans or other nuts to readily pass therethrough onto the canvas.

With reference to the manner in which the ribs 13, and the circumferential framing are joined and supported on the rollers 7 and 7' (FIG. 5) it will be noted that the fittings 19 to which the outer ends of the ribs are attached, are formed with bottom and top flanged portions 41 and 42 which are respectively bolted to a fitting 43, having an opening 44, to receive the upper end portion of the roller hanger 8, and to the plate 23 used to secure the outer end of rib 13 to the fitting. The inner ends of the ribs are secured to fittings 19' which are supported on the flange 15 of the central hub 12, the lower flanges 42' of the fittings being bolted to the flange 15, the end portions of the ribs being clamped to the upper flanges 41', of the fittings 19' by means of plates 23' and bolts 25' (FIG. 6). One of the fittings 43 at the hinged end of one of the ribs of a section 5 is formed with a ball 44' and a trailer hitch 45 (FIG. 5) and the fitting 43 at the hinged end of the adjacent rib of the other section 5 is provided with a socket 46 to receive the ball, whereby the sections 5 of the nut catching unit may be opened for placement about a tree, and the unit moved into operative position by means of a tractor, not shown.

Figure 14:
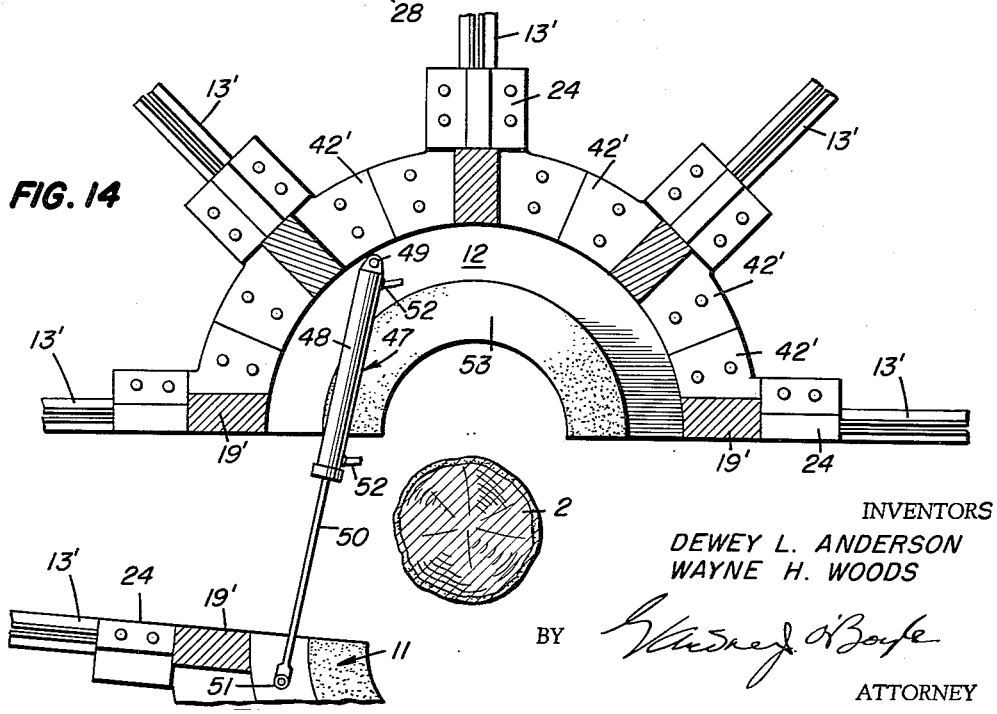
FIG. 14 is a sectional view taken along line 14—14 of FIG. 5.

In order to open and close the sections 5 for placement of the unit in the operative position with respect to a tree, a hydraulic unit 47 is provided. As will be seen in FIGS. 2 and 14, this unit comprises a cylinder 48 having one end pivotally attached as at 49 to the hub portion 12 of one of the sections 5, and a piston rod 50 pivotally connected as at 51 to the hub portion 12 of the other section 5 of the unit. The piston cylinder 48 is provided with suitable fittings 52 for connection with a source of fluid, not shown. The semi-circular opening of each of the hub portions 12 is provided with a rubber lining 53 (FIG. 9) to protect the trunk of a tree from accidental abrasion during placement of the unit in nut catching position about the tree. Portions of the abutting faces 54 of the ribs (FIG. 2) and the wheel assemblies 55 at the ends of the ribs may also be provided with a protective covering material of rubber or the like, to prevent abrasion or other damage to a tree during placement of the unit. For the purpose of diverting pecans or other nuts which may be in the path of the wheels 7, 7', each of the wheels is provided with a guard 56, formed from rubber, metal or plastic, pivotally mounted on the bracket 8' of the wheel assembly.

From the description so far it will be seen that the improved nut catching unit comprises a pair of hinged, semi-circular frames mounted on rollers, and adapted to be moved along the ground by means of a tractor; the frames are opened or closed for placement or removable from nut catching position with respect to a tree by means of a fluid motor; the tops of the frames are covered with screening material and the nuts which pass therethrough fall into an inverted conical-shaped member formed from canvas which opens into a collecting bin, from which bin the nuts are conveyed to storage. In harvesting pecans, or other nuts, in accordance with the present invention, it is contemplated that a mechanical tree-shaking device will be used to shake or jar the nuts so that they will fall onto the unit and gravitate into the collecting bin.

One of the important features of the present invention is the construction and arrangement of the nut collecting bin and the associated conveyor means for conveying the nuts from the bin to storage. Referring to FIGS. 5, 15 and 16, the nut collecting bin 3 which is open topped and of generally rectangular shape in plan, comprises a sloping bottom 57, side walls 58, a vertical end wall 59, and a sloping end wall 60, having a re-entrant portion 61 to receive the trunk of a tree when the unit is moved to operative position. The bin 3 is supported on the harvesting unit by means of flanges 62 of the channel members 62' secured to the side walls 58 in the vicinity of the tops thereof, which flanges are adapted for sliding engagement with the inturned flanges 63 of channel members 63' secured to rods 64 (FIG. 5) threaded into the flange portion 15 of the hub. In this connection it will be understood that the flanges 63 are of substantially the same length as the flanges 62 and that they are parallel when the sections 5 are moved to closed positions about a tree. The inner ends of the flanges 62 are formed with downwardly turned ends 65 to provide stop means for limiting the inward travel of the bin on the lower flanges 63 carried by the hub portions of the semi-circular sections.

The bottom of the bin is provided with an opening 66 through which the nuts are discharged onto a conveyor section 66', the end portion 67 of said section being positioned within a trough-like member 68 attached to the bottom of the bin. The opposite end of the conveyor section 66' is supported on the circumferential framing by means of a loop 69 adapted for engagement with a hook, not shown, secured to the framing. An additional conveyor section 66a may be connected to the discharge end of the section 66', in order to convey the nuts to a truck, or other vehicle, for transportation to storage. The conveyor section 66' is driven by an electric motor 70 and additional sections 66a, as may be required, are driven by a belt 71 and pulleys 72, as shown.

In use, assuming that the unit has been towed, or otherwise moved to a pecan grove, or other nut harvesting area, the sections 5 are opened as shown in FIG. 2 by means of the fluid motor 47, and the unit is then moved in the direction of a tree 2 until the sections embrace the tree as shown in the dotted line position. The sections 5 are then closed about the tree, and the bin 3 and associated conveyor sections mounted in operative position on the frames, as shown in FIG. 1. Thereafterwards the tree is shaken by means of suitable shaking apparatus to remove the nuts from the tree, and prior to or simultaneous with the shaking operation the conveyors 66 and 66' are activated by the motor 70 to remove the nuts which have fallen through the screen 10 onto the canvas 11 and into the collection bin.

After the nuts on one of the trees have been removed, collected, and conveyed to storage, the bin and conveyor sections are removed, or temporarily supported on the unit in such fashion as to permit the sections to be opened so that the unit can be withdrawn, preparatory to moving it into operative position with respect to another tree in the harvesting area. When so positioned, the above described procedure is repeated.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

We claim:

1. A mobile, circular-shaped nut harvesting unit for positioning under a tree to receive and collect nuts falling therefrom, comprising a pair of hinged, complementary, semi-circular-shaped nut catching members adapted for placement around the trunk of a tree from which nuts are to be harvested, each of the semi-circular nut catching members comprising a central hub portion, a circumferential framing comprising a pair of vertically spaced tubular members, a plurality of radial ribs having their inner ends secured to said hub portion and having their outer ends secured to the circumferential framing a plurality of longitudinally spaced, depending hangers secured to the bottom of each radial rib, and a semi-circular canvas member supported by the hangers, the outer peripheral portion of the canvas member being connected to the lower circumferential tubular member, the inner peripheral portion of the canvas member being connected to the central hub portion, the hangers being of gradually decreasing length from the hub portion to the circumferential framing whereby the canvas member is supported in a downwardly inclined position, screen means superposed on each of the semi-circular members for separating leaves, twigs, and other foreign materials from the nuts falling thereon, a bin removably mounted on and beneath the semi-circular members for collecting the nuts which pass through the screen means, and conveyor means operatively connected to the bin for removing nuts therefrom and conveying them to storage.

2. A mobile, circular-shaped nut harvesting unit according to claim 1 wherein the screen means comprises a semi-circular screen member secured to the top of each radial rib, the outer peripheral portion of said screen member being secured to the upper tubular member of the circumferential framing, and the inner peripheral portion of the screen member being connected to the central hub portion.

3. A mobile, circular-shaped nut harvesting unit according to claim 1, wherein the outer peripheral portion of the canvas member is secured to the lower circumferential tubular member by means of coil springs, each of the spring having a hook end engaged with the outer peripheral portion of the canvas, the opposite end of the spring being threadably secured to the lower circumferential tubular member; a pair of depending rods secured to the hub portion, a semi-circular ring secured to the lower ends of said rods, the inner peripheral portion of the canvas member being folded to form a loop, said loop being threaded on the semi-circular ring, the inner peripheral portion of the canvas member lying in a horizontal plane below the plane of its outer peripheral portion, thereby forming a funnel-shaped nut catching member.

4. A mobile, circular-shaped nut harvesting unit according to claim 1 wherein a pair of depending rods having oppositely facing flanges secured to the lower ends thereof are supported by each hub portion, the bin being provided with a pair of flanges in slidable engagement with the rod flanges whereby the bin is removably secured to the harvesting unit; and endless conveyor having one end pivotally mounted on the bin, the opposite end of the conveyor being suspended on the circumferential framing of the harvesting unit whereby the nuts collected in the bin are conveyed to storage.

5. A mobile, circular-shaped nut harvesting unit according to claim 1 wherein a plurality of rollers are connected to the circumferential framing and hub portion respectively, to facilitate moving the harvesting unit over the ground, each roller being provided with deflector means whereby nuts which have fallen to the ground will be diverted from the paths of the rollers as the harvesting unit is moved into and out of operative position with respect to a tree.

6. A mobile, circular-shaped nut harvesting unit according to claim 1 wherein a fluid motor is connected between the hub portions of the semi-circular nut catching members for moving the hinged nut catching members into operative position with respect to a tree, the hub portions being provided with a rubber lining to prevent abrasive damage to a tree during placement of the harvesting unit in nut catching position.

References Cited in the file of this patent

UNITED STATES PATENTS

| | | |
|---|---|---|
| 1,286,980 | Fleckner | Dec. 10, 1918 |
| 1,473,081 | Cook | Nov. 6, 1923 |
| 1,626,068 | Bartlett | Apr. 26, 1927 |
| 2,436,173 | Knapp | Feb. 17, 1948 |
| 2,714,281 | Steele | Aug. 2, 1955 |